US007441860B2

(12) United States Patent
Murakami

(10) Patent No.: US 7,441,860 B2
(45) Date of Patent: Oct. 28, 2008

(54) PRINT INSTRUCTION DEVICE AND PRINTING APPARATUS

(75) Inventor: Yoshiki Murakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 11/170,060

(22) Filed: Jun. 30, 2005

(65) Prior Publication Data

US 2006/0001728 A1 Jan. 5, 2006

(30) Foreign Application Priority Data

Jun. 30, 2004 (JP) ............................ 2004-192580

(51) Int. Cl.
*B41J 29/393* (2006.01)
*B41J 29/38* (2006.01)
*G06F 15/00* (2006.01)

(52) U.S. Cl. .......................... 347/19; 347/17; 358/1.13; 358/1.14

(58) Field of Classification Search .................. 347/14, 347/17, 19; 358/1.13, 1.14
See application file for complete search history.

(56) References Cited

U.S. PATENT DOCUMENTS 6,655,772 B2 * 12/2003 Danzuka et al. ............... 347/14
6,867,873 B1 * 3/2005 Han .......................... 358/1.12
2002/0196457 A1 * 12/2002 Nunokawa ................. 358/1.13
2004/0233269 A1 * 11/2004 Tsubota ...................... 347/223

FOREIGN PATENT DOCUMENTS

| | | | |
|---|---|---|---|
| JP | 63-53046 | A | 3/1988 |
| JP | 3-240556 | A | 10/1991 |
| JP | 6-191111 | A | 7/1994 |
| JP | 8-39883 | A | 2/1996 |
| JP | 9-11494 | A | 1/1997 |

* cited by examiner

*Primary Examiner*—K. Feggins
*Assistant Examiner*—Jannelle M Lebron
(74) *Attorney, Agent, or Firm*—Sughrue Mion, PLLC

(57) ABSTRACT

When a printing requirement is made, in the case where the internal temperature of a printer is equal to or lower than 40° C., print data is to be generated using a LUT for a normal state (S170), while in the case where the temperature is higher than 40° C., the user is allowed to select a subsequent operation via a high-temperature state selection screen (S120 and S130). When a print continuation button is pressed, print data is to be generated using a LUT for a high-temperature state (S180), while when a print standby button is pressed, a cooling command is to be sent out, and then print data is to be generated using the LUT for a normal state after waiting until the internal temperature becomes lower than 40° C. (S140 to S170).

10 Claims, 4 Drawing Sheets

PRINT INSTRUCTION DEVICE AND PRINTING APPARATUS

BACKGROUND OF THE INVENTION

1. Field of the Invention

The present invention relates to a print instruction device and a printing apparatus, and more specifically to a print instruction device for instructing a printer comprising a temperature sensor for detecting the temperature of a predetermined portion to perform a printing operation, and a printing apparatus having the function of this kind of printer and print instruction device.

2. Description of the Prior Art

As a technique related to a print instruction device of this kind, there have conventionally been proposed inkjet printers adapted to spray ink onto paper to perform a printing operation, wherein the printing operation is stopped with an increase in the temperature of, for example, the print head for producing a jet of ink (refer to Japanese Published Unexamined Patent Application Nos. H8-39883 and H9-11494 for example). In these devices, when the temperature of the print head, etc., reaches a predetermined temperature or higher, the printing operation is to be stopped, and then to be restarted after the temperature has decreased down to an appropriate value, which allows printing quality to be ensured.

SUMMARY OF THE INVENTION

In the above-mentioned printers, the printing operation is to be stopped with an increase in the temperature of the print head, etc., which requires a long time to complete the operation. Meanwhile, it maybe preferable, in accordance with the content of printed matter and/or user's preference, to perform a printing operation immediately even though there may be a slight deterioration in printing quality.

Accordingly, it is an object of the present invention to provide a print instruction device and a printing apparatus in which the printing quality, when a printer is in a high-temperature state, is further improved. It is also an object of the present invention to provide a print instruction device and a printing apparatus in which the operation of a printer in a high-temperature state can be selected by a user.

In order to achieve at least part of the above-mentioned objects, the present invention provides a print instruction device and a printing apparatus employing the following arrangements.

The present invention is directed to a print instruction device for instructing a printer including a temperature sensor for detecting the temperature of a predetermined portion to perform a printing operation, and the print instruction device including: a temperature acquisition unit for acquiring the temperature detected by the temperature sensor when a printing requirement is made; a print data generation unit for generating print data printable by the printer by performing color conversion processing in which the color space of image data according to the printing requirement is converted into the color space for printing operation based on the acquired temperature; and a print instruction unit for instructing the printer to print the generated print data.

In this print instruction device according to the present invention, when a printing requirement is made, the temperature of a predetermined portion of the printer is to be acquired, and then print data is to be generated by performing color conversion processing based on the acquired temperature. That is, print data can be generated by performing color conversion processing based on the temperature of the printer whereby the concentration value in the color space for printing operation corresponds to the temperature of the printer. Accordingly, it is possible to further reduce the impact of the temperature of the printer on printing quality, and to further improve the printing quality in a high-temperature state. Additionally, as a "predetermined portion of the printer" can be cited each portion inside or on the surface of the printer, for example, a portion around the print head of an inkjet printer.

The above-mentioned print instruction device according to the present invention may be arranged in such a manner that the print data generation unit generates print data by performing color conversion processing in such a manner that the higher the acquired temperature is, the smaller the concentration value in the color space for printing operation is. This allows color conversion processing to be performed in such a manner that the higher the temperature of the printer is, the smaller the concentration value in the color space for printing operation is. Here, the concentration value in the color space for printing operation is reduced with an increase in the temperature of the printer for the reason that since the discharge amount of ink is increased with an increase in the temperature of the printer, it is considered that it is possible to reduce the impact of the increase in the discharge amount of ink on printing quality by reducing the concentration value in the color space for printing operation.

Also, the print instruction device according to the present invention may be arranged in such a manner that the print data generation unit generates print data by performing color conversion processing using a color conversion table for a normal state when the acquired temperature is lower than a predetermined temperature, while generating print data by performing color conversion processing using a color conversion table for a high-temperature state whereby the concentration value in the color space for printing operation becomes smaller in comparison with the color conversion table for a normal state when the acquired temperature is equal to or higher than the predetermined temperature. This allows color conversion processing to be performed in such a manner that the concentration value in the color space for printing operation is reduced in a high-temperature state by using the color conversion tables for a normal state and for a high-temperature state appropriately when the temperature of the printer is, respectively, lower than and equal to or higher than the predetermined temperature. In addition, it is only required to use the color conversion tables for a normal state and for a high-temperature state appropriately, which allows the processing to be simplified. In this case, the print instruction device maybe arranged to further include a selection instruction receiving unit for receiving a selection instruction of print continuation or print standby when the temperature acquired by the temperature acquisition unit is equal to or higher than the predetermined temperature, wherein the print data generation unit generates print data by performing color conversion processing using the color conversion table for a high-temperature state when the selection instruction receiving unit receives an instruction of print continuation, while generating print data by performing color conversion processing using the color conversion table for a normal state when the selection instruction receiving unit receives an instruction of print standby. This allows a selection instruction of print continuation or print standby to be received when the temperature of the printer is equal to or higher than the predetermined temperature, and when an instruction of print continuation is received, color conversion processing to be performed using the color conversion table for a high-temperature state, while when an instruction of print standby is received, color conversion processing to be performed using the color conversion table for a normal state. That is, when the temperature of the printer is equal to or higher than the predetermined temperature, users can select whether to continue the printing operation using the color conversion table for a high-temperature state or to turn the printing operation into a standby state to be performed afterward using the color conversion table for a normal state. Accordingly, it is possible to allow users to select the operation of the printer in a high-temperature state.

Further in this aspect of the present invention, the print instruction device may be arranged in such a manner that the selection instruction receiving unit receives a selection instruction of print continuation or print standby via a high-temperature state selection screen where help information is displayed when the printer is in a high-temperature state and a selection instruction of print continuation or print standby is capable of being made. This allows a selection instruction of print continuation or print standby to be received via the high-temperature state selection screen, and help information to be displayed for users. It may also be arranged that when the selection instruction receiving unit receives an instruction of print standby, the print data generation unit generates print data by performing color conversion processing using the color conversion table for a normal state after the temperature of the predetermined portion of the printer becomes lower than the predetermined temperature, or that when the selection instruction receiving unit receives an instruction of print standby, the print instruction unit instructs the printer to print the print data after the temperature of the predetermined portion of the printer becomes lower than the predetermined temperature. This allows the print data generation unit to generate print data or the print instruction unit to make a printing instruction after the temperature of the printer becomes lower than the predetermined temperature, whereby it is possible to turn the printing operation into a standby state until the temperature of the printer becomes lower than the predetermined temperature. It may be arranged alternatively that the printer has a cooling unit capable of cooling the predetermined portion, and the print instruction device further including a cooling instruction unit for instructing the printer, when the selection instruction receiving unit receives an instruction of print standby, to make the cooling capacity of the cooling unit higher compared with the cooling capacity in a normal state. This allows the printer to be instructed so that the cooling capacity of the cooling means is increased when turning the printing operation into a standby state. Accordingly, the printer can be cooled more quickly. In this case, it maybe arranged that the cooling unit has a cooling fan, and the cooling instruction unit instructs the printer so that the rotational speed of the cooling fan is higher than the rotational speed in a normal state.

The technique of the present invention is not restricted to the print instruction device, but may also be actualized by a print instruction method. In that case, each aspect of the print instruction device described above can be performed in the form of the print instruction method.

The present invention is also directed to a printing apparatus housing in a single chassis; a printer having a temperature sensor for detecting the temperature of a predetermined portion; a temperature acquisition unit for acquiring the temperature detected by the temperature sensor when a printing requirement is made; a print data generation unit for generating print data printable by the printer by performing color conversion processing in which the color space of image data according to the printing requirement is converted into the color space for printing operation based on the acquired temperature; and a print instruction unit for instructing the printer to print the generated print data.

In this print instruction device according to the present invention, when a printing requirement is made, the temperature of a predetermined portion of the printer is to be acquired, and then print data is to be generated by performing color conversion processing based on the acquired temperature. That is, print data can be generated by performing color conversion processing based on the temperature of the printer whereby the concentration value in the color space for printing operation corresponds to the temperature of the printer. Accordingly, it is possible to further reduce the impact of the temperature of the printer on printing quality, and to further improve the printing quality in a high-temperature state. Additionally, as a "predetermined portion of the printer" can be cited each portion inside or on the surface of the printer, for example, a portion around the print head of an inkjet printer.

The present invention is also directed to a storage medium storing a program for allowing a computer to function as a print instruction device for instructing a printer including temperature detection means for detecting the temperature of a predetermined portion to perform a printing operation, and the program including: a temperature acquisition module for acquiring the temperature detected by the temperature detection means in the printer when a printing requirement is made; a print data generation module for generating print data printable by the printer by performing color conversion processing in which the color space of image data according to the printing requirement is converted into the color space for printing operation based on the acquired temperature; and a print instruction module for instructing the printer to print the generated print data.

The storing medium according to the present invention is allowed to function as the above-mentioned print instruction device of the present invention by installing and running the program stored therein in the computer. It is therefore possible to exhibit the same effects as those presented by the above-mentioned print instruction device of the present invention.

DESCRIPTION OF THE PREFERRED EMBODIMENTS

Figure 1:
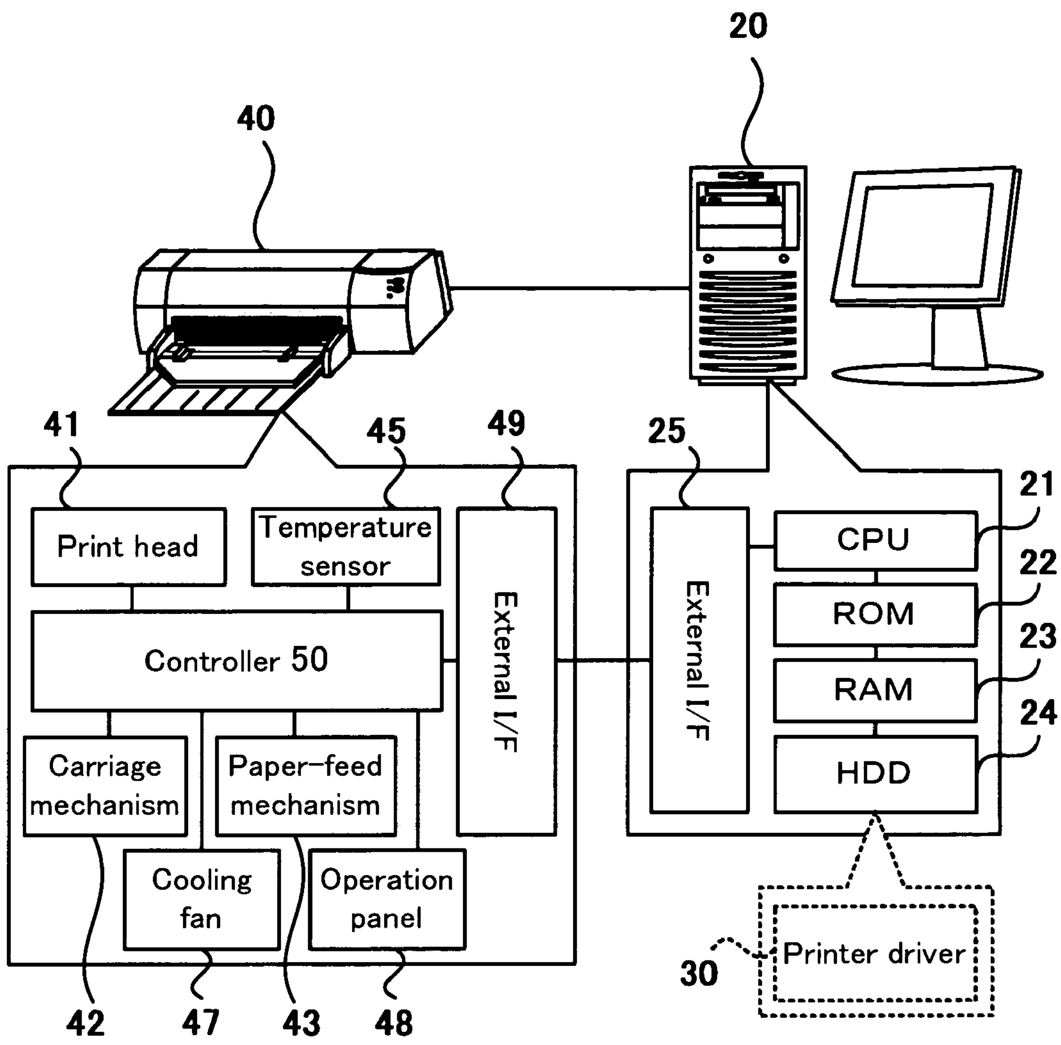
FIG. 1 is a schematic block diagram of a system including a client computer 20.

Next will be described a preferred embodiment of the present invention. FIG. 1 is a schematic block diagram of a system including a client computer 20 that functions as a print instruction device according to one embodiment of the present invention. The client computer 20 in the embodiment, which is formed as a multi-purpose computer including mainly a CPU 21, a ROM 22, a RAM 23, and an HDD 24 as shown in the figure, sends print data to a printer 40 communicatively connected thereto via an external interface 25. In the HDD 24 is installed a printer driver 30 for allowing the multi-purpose computer to function as a print instruction device according to the present invention.

As shown in the figure, the printer 40, which is formed as a common inkjet printer, includes: a print head 41 for discharging ink from a mounted ink cartridge filled therewith; a carriage mechanism 42 for moving the print head 41 in the direction (main scanning direction) approximately perpendicular to the paper conveying direction; a paper-feed mechanism 43 for conveying paper: a temperature sensor 45 for detecting the temperature inside the printer 40; a cooling fan 47 for cooling inside the printer 40; an operation panel 48 for displaying messages, etc., and for receiving operations from users; an external interface 49 for providing a connection with an external device such as the client computer 20; and a controller 50 for controlling the overall operation of the printer 40. The printer is adapted to discharge ink onto paper to print characters and images based on print data sent from the client computer 20. The temperature sensor 45 is provided at an appropriate position (e.g. on the periphery of the print head 41) inside the printer 40.

Figure 2:
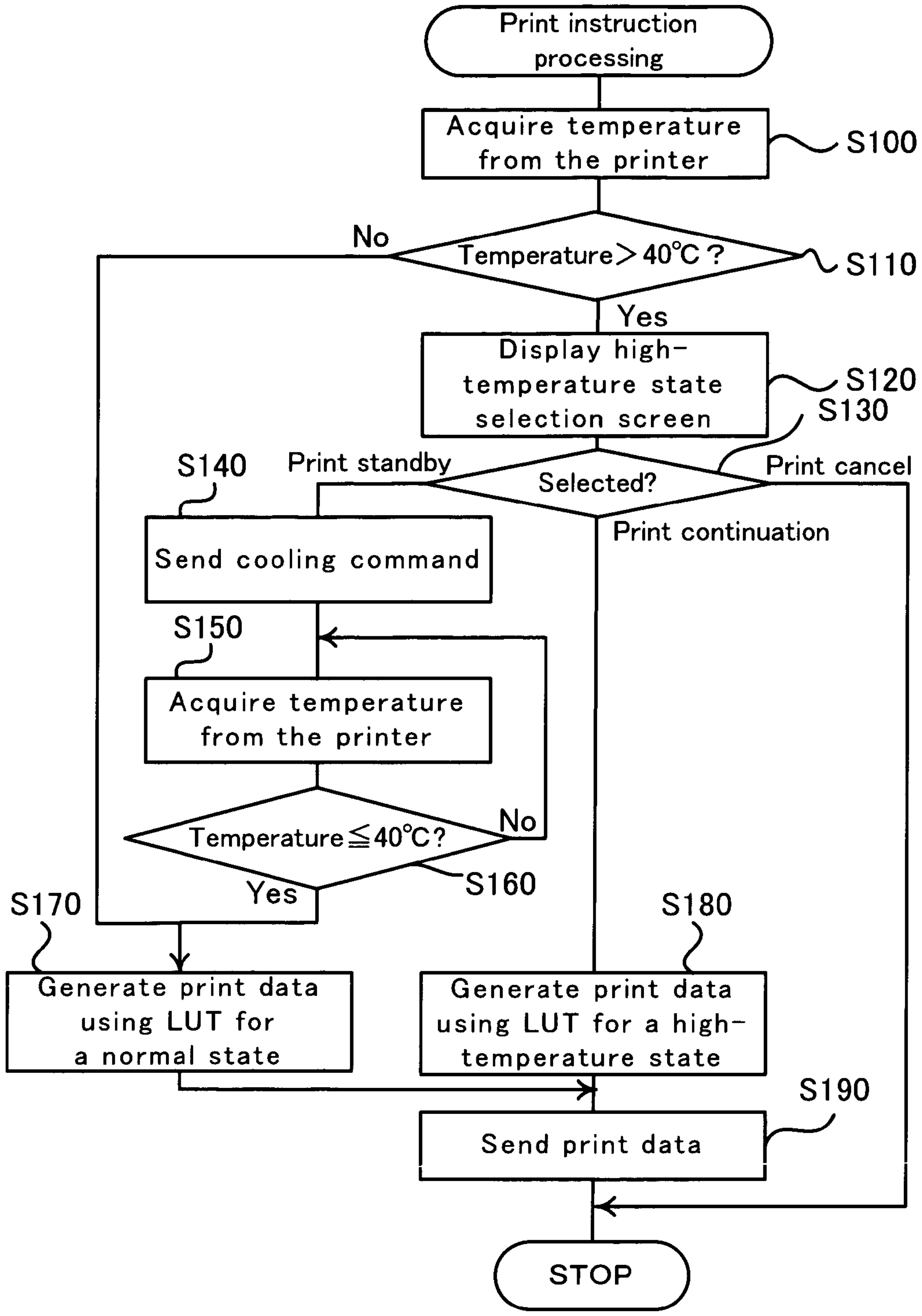
FIG. 2 is a flowchart showing one example of print instruction processing.

Next will be described the operation of the thus arranged client computer 20, especially when instructing the printer 40 to perform a printing operation. FIG. 2 is a flowchart showing one example of print instruction processing to be performed by the CPU 21 of the client computer 20. This processing is to be performed when a printing requirement for image data is made from an application program, etc., installed in the HDD 24.

In the print instruction processing, the processing for acquiring the internal temperature of the printer 40 detected by the temperature sensor 45 is first performed as shown in the figure (step S100). This processing is performed by sending a predetermined command for inquiring about the internal temperature to the printer 40.

Subsequently, it is determined whether or not the acquired internal temperature is more than 40° C. (step S110), and in the case of 40° C. or lower, print data is to be generated by performing color conversion processing on the image data required to be printed using a look-up table (hereinafter referred to as LUT) for a normal state as a LUT for converting the color space of image data (e.g. RGB color space) into the color space for printing operation (e.g. CMYK color space) (step S170). Here, LUT is a table for managing the correspondence between the brightness value of each color in the color space of image data and the concentration value of each color in the color space for printing operation. Additionally, in addition to color conversion processing, binarization processing, etc., using the dither method and/or error diffusion method is to be performed when generating print data.

Figure 3:
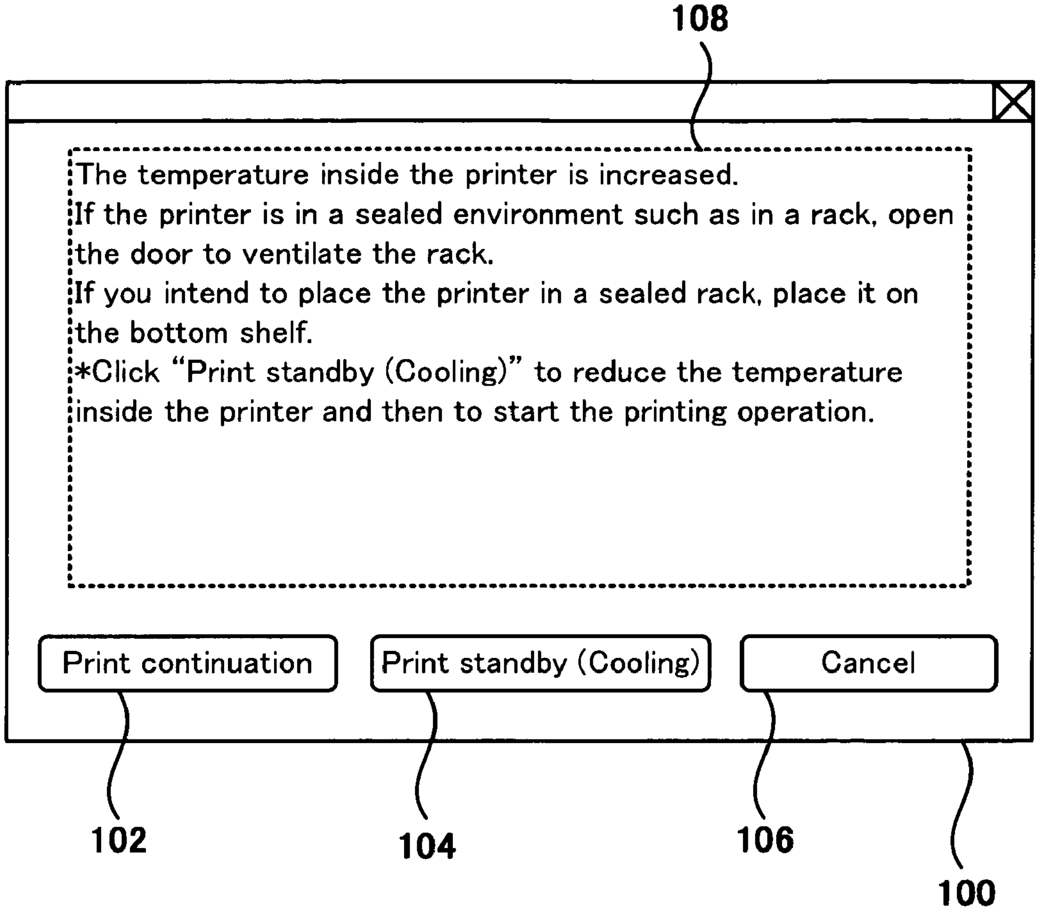
FIG. 3 is an illustrative view showing one example of a high-temperature state selection screen 100.

Meanwhile, in the case where the internal temperature is more than 40° C., a high-temperature state selection screen 100 for allowing users to select a subsequent operation is to be displayed on the monitor of the client computer 20 (step S120). FIG. 3 is an illustrative view showing one example of the high-temperature state selection screen 100. The high-temperature state selection screen 100 is arranged in such a manner, as shown in the figure, that a subsequent operation can be selected via a print continuation button 102, a print standby button 104, or a print cancel button 106, and that high-temperature state help information 108 for notifying that the printer 40 is in a high-temperature state is displayed. The high-temperature state help information 108 contains information such as points to keep in mind when the printer 40 is in a high-temperature state.

Then, when the print continuation button 102 on the high-temperature state selection screen 100 is pressed, print data is to be generated by performing color conversion processing on the image data using a LUT for a high-temperature state (step S180). The LUT for a high-temperature state is set in such a manner that the concentration value of each color in the color space for printing operation becomes smaller in comparison with the LUT for a normal state. Here, the LUT for a high-temperature state is set in such a manner that the concentration value of each color becomes smaller, for the reason that since the discharge amount of ink in a high-temperature state is increased relative to that in a normal state due to, for example, a reduction in the viscosity of the ink. It is considered that it is possible to reduce the impact of the increase in the discharge amount of ink on printing quality by performing color conversion processing so that the concentration value of each color in the color space for printing operation is reduced relative to that in a normal state. In the embodiment, a LUT suitable in a high-temperature state has been defined via an experiment, etc., to be preset as a LUT for a high-temperature state.

Meanwhile, when the print standby button 104 on the high-temperature state selection screen 100 is pressed, a cooling command is to be sent to the printer 40 to be instructed to perform a cooling operation (step S140). This cooling command is preset as a command for allowing the printer 40 receiving the command to operate the cooling fan 47 at a higher speed for a high-temperature state relative to that in a normal state.

Figure 4:
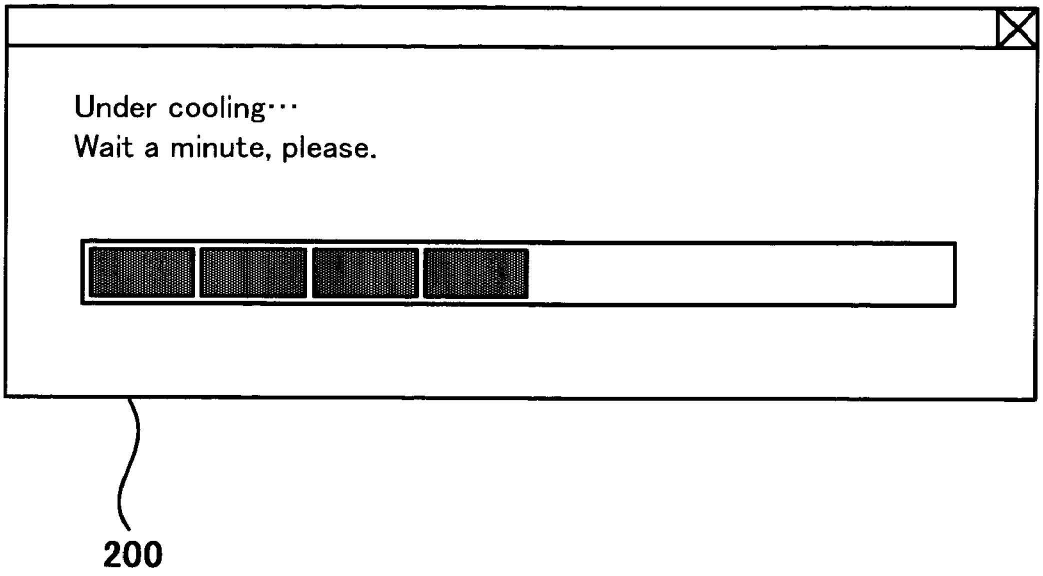
FIG. 4 is an illustrative view showing one example of a cooling progression display screen 200.

When the cooling command is thus sent, the internal temperature is to be acquired from the printer 40 repeatedly at a predetermined interval (e.g. 1 second) to be in a standby state until the internal temperature becomes lower than 40° C. (steps S150 and S160), and when the internal temperature becomes lower than 40° C., print data is to be generated by performing color conversion processing on the image data using the LUT for a normal state (step S170). Additionally, a cooling progression display screen 200 exemplified in FIG. 4 is to be displayed on the monitor of the client computer 20 while waiting until the internal temperature becomes lower than 40° C. In the cooling progression display screen 200 is displayed a progress bar for indicating the progress of cooling inside the printer 40 (lowering condition of the internal temperature) as shown in the figure. This progress bar is displayed by determining the lowering condition of the internal temperature based on repeatedly acquired internal temperatures.

After print data has been thus generated by performing color conversion processing using the LUT for a normal state or high-temperature state, the generated print data is to be sent to the printer 40 (step S190) to terminate the print instruction processing. The printer 40 receiving the print data drives the print head 41, carriage mechanism 42, paper-feed mechanism 43, etc., based on the received print data to perform a printing operation. Additionally, when the print cancel button 106 on the high-temperature state selection screen 100 is pressed in step S130, the processing is to be terminated directly.

In accordance with the client computer 20 according to the above-described embodiment, print data can be generated by acquiring the internal temperature of the printer 40 when a printing requirement is made, and then performing color conversion processing using the LUT for a high-temperature state in the case where the acquired temperature is more than 40° C. and an instruction of print continuation is made, while performing color conversion processing using the LUT for a normal state in the case where the acquired temperature is equal to or lower than 40° C., or the acquired temperature is more than 40° C. but an instruction of print standby is made. That is, print data can be generated by performing color conversion processing based on the internal temperature of the printer 40 whereby the concentration value in the color space for printing operation corresponds to the internal temperature of the printer 40. Accordingly, it is possible to further reduce the impact of the internal temperature of the printer 40 on printing quality, and to further improve the printing quality in a high-temperature state. In addition, it is only required to use the LUTs for a normal state and for a high-temperature state appropriately, which allows the processing to be simplified. Further, when the internal temperature of the printer 40 is more than 40° C., an instruction of print continuation, print standby, or print cancel is to be received via the high-temperature state selection screen 100, whereby it is possible to allow users to select the operation of the printer 40 in a high-temperature state.

Also, in accordance with the client computer 20 according to the embodiment, when an instruction of print standby is made via the high-temperature state selection screen 100, a cooling command is to be sent to the printer 40, whereby the cooling fan 47 of the printer 40 can be operated at a higher speed relative to that in a normal state. Accordingly, the printer 40 can be cooled more quickly.

Here, in the client computer 20 according to the embodiment, the CPU 21 performing the processing in step S100 corresponds to a temperature acquisition unit; the CPU 21 performing the processing in steps S110 to S130 corresponds to a selection instruction receiving unit; the CPU 21 performing the processing in step S140 corresponds to a cooling instruction unit; the CPU 21 performing the processing in steps S150 to S180 corresponds to a print data generation unit; and the CPU 21 performing the processing in step S190 corresponds to a print instruction unit. Also, in the embodiment, the temperature sensor 45 of the printer 40 corresponds to a temperature sensor; and the cooling fan 47 of the printer 40 corresponds to a cooling unit. Further, the printer driver 30 in the embodiment corresponds to a program stored in a storage medium.

It is a matter of course, in the client computer 20 according to the embodiment, that although it is determined whether or not the internal temperature of the printer 40 is more than 40° C., the determination temperature is not limited to 40° C. Although the LUTs for a high-temperature state and for a normal state are used appropriately to perform color conversion processing according to the internal temperature of the printer 40, the invention is not limited thereto, but it is only required that color conversion processing can be performed in such a manner that the concentration value in the color space for printing operation in a high-temperature state becomes smaller. It may be arranged, for example, that after performing color conversion processing using the LUT for a normal state, data processing, whereby the higher the internal temperature of the printer 40 is, the smaller the concentration value is, is to be performed. Various kinds of other color conversion processing may also be performed as long as they are in accordance with the internal temperature of the printer 40.

In the client computer 20 according to the embodiment, although when the internal temperature of the printer 40 is more than 40° C., the high-temperature state selection screen 100 is to be displayed to allow users to select a subsequent operation, no subsequent operation may be selected via the high-temperature state selection screen 100. In this case, when the internal temperature of the printer 40 is more than 40° C., it is only required to continue the printing operation constantly and to generate print data by performing color conversion processing using the LUT for a high-temperature state.

In the client computer 20 according to the embodiment, although the high-temperature state help information 108 is to be displayed on the high-temperature state selection screen 100, it may not be displayed.

In the client computer 20 according to the embodiment, although the cooling command is preset as a command for allowing the cooling fan 47 of the printer 40 to operate at a higher speed for a high-temperature state relative to that in a normal state, if the printer 40 includes cooling means other than the cooling fan 47, the cooling command may be preset as a command for allowing this cooling means to operate at a higher cooling capacity relative to that in a normal state. No instruction of cooling may also be made for the printer 40.

In the client computer 20 according to the embodiment, although the internal temperature is to be acquired from the printer 40 repeatedly at a predetermined interval to be in a standby state until the internal temperature becomes lower than 40° C., the internal temperature may not necessarily be acquired repeatedly to be in a standby state until a predetermined waiting time passes.

In the client computer 20 according to the embodiment, although after a cooling command is sent to the printer 40, print data is to be generated after waiting until the internal temperature of the printer 40 becomes lower than 40° C., it may be arranged that print data is to be generated after a cooling command is sent out, and subsequently, the print data is to be sent out after waiting until the internal temperature becomes lower than 40° C. Also, print data may be printed after waiting until the internal temperature becomes lower than 40° C. not on the side of the client computer 20 but of the printer 40. In this case, it is only required to send print data accompanied with a control command for allowing the printer to thus operate.

In the embodiment, although the temperature sensor 45 of the printer 40 is provided at an appropriate position inside the printer 40, it may be provided on the surface of the printer 40.

In the embodiment, although the printer 40 is formed as an inkjet printer, the invention is not limited thereto, but may be another printer such as an electrophotographic one.

In the embodiment, the present invention, in which print data is generated by performing color conversion processing based on the internal temperature of the printer 40, is described in the form of the client computer 20, it may be in the form of a printing apparatus in which the printer 40 is allowed to function as a print instruction device according to the present invention. In this case, it is only required that the controller 50 of the printer 40, etc., performs processing corresponding to the print instruction processing in FIG. 2.

It is a matter of course that although the best mode for carrying out the present invention has been described heretofore with reference to the embodiment, the present invention is not limited to the embodiment at all but may be embodied in other specific forms without departing from the gist thereof.

The disclosure of Japanese Patent Application No. 2004-192580 filed Jun. 30, 2004 including specification, drawings and claims is incorporated herein by reference in its entirety.

What is claimed is:

1. A print instruction device for instructing a printer comprising a temperature sensor for detecting the temperature of a predetermined portion to perform a printing operation, the print instruction device comprising:

a temperature acquisition unit for acquiring the temperature detected by the temperature sensor in case a printing requirement is made;

a selection instruction receiving unit for receiving a selection instruction of print continuation or print standby in case the temperature acquired by the temperature acquisition unit is equal to or higher than predetermined temperature;

a print data generation unit for generating print data printable by the printer by performing color conversion processing, in which the color space of image data according to the printing requirement is converted into the color space for printing operation, by using a color conversion table for a normal state in case the temperature acquired by the temperature acquisition unit is lower than the predetermined temperature, generating print data by performing color conversion processing using the color conversion table for a high-temperature state whereby the concentration value in the color space for printing operation becomes smaller in comparison with the color conversion table for the normal state in case the selection instruction receiving unit receives an instruction of print continuation, and generating print data by performing color conversion processing using the color conversion table for the normal state after the temperature of the predetermined portion of the printer becomes lower than the predetermined temperature in case the selection instruction receiving unit receives an instruction of print standby; and a print instruction unit for instructing the printer to print the generated print data.

2. A print instruction device according to claim 1, wherein the printer has a cooling unit capable of cooling the predetermined portion, the print instruction device further comprising a cooling instruction unit for instructing the printer, in case the selection instruction receiving unit receives an instruction of print standby, to make the cooling capacity of the cooling unit higher compared with the cooling capacity in a normal state.

3. A print instruction device according to claim 2, wherein the cooling unit has a cooling fan, and the cooling instruction unit instructs the printer so that the rotational speed of the cooling fan is higher than the rotational speed in a normal state.

4. A printing apparatus housing in a single chassis: a printer having a temperature sensor for detecting the temperature of a predetermined portion; a temperature acquisition unit for acquiring the temperature detected by the temperature sensor in case a printing requirement is made; a selection instruction receiving unit for receiving a selection instruction of print continuation or print standby in case the temperature acquired by the temperature acquisition unit is equal to or higher than predetermined temperature; a print data generation unit for generating print data printable by the printer by performing color conversion processing, in which the color space of image data according to the printing requirement is converted into the color space for printing operation, by using a color conversion table for a normal state in case the temperature acquired by the temperature acquisition unit is lower than the predetermined temperature, generating print data by performing color conversion processing using the color conversion table for a high-temperature state whereby the concentration value in the color space for printing operation becomes smaller in comparison with the color conversion table for the normal state in case the selection instruction receiving unit receives an instruction of print continuation, and generating print data by performing color conversion processing using the color conversion table for the normal state after the temperature of the predetermined portion of the printer becomes lower than the predetermined temperature in case the selection instruction receiving unit receives an instruction of print standby; and a print instruction unit for instructing the printer to print the generated print data.

5. A print instruction method for instructing a printer comprising a temperature sensor for detecting the temperature of a predetermined portion to perform a printing operation, the print instruction method comprising the steps of:

(a) acquiring the temperature detected by the temperature sensor in case a printing requirement is made;

(a1) receiving a selection instruction of print continuation or print standby in case the acquired temperature is equal to or higher than predetermined temperature.

(b) generating print data printable by the printer by performing color conversion processing, in which the color space of image data according to the printing requirement is converted into the color space for printing operation, by using a color conversion table for a normal state in case the acquired temperature at step (a) is lower than the predetermined temperature, generating print data by performing color conversion processing using the color conversion table for a high-temperature state whereby the concentration value in the color space for printing operation becomes smaller in comparison with the color conversion table for the normal state in case the step (a1) receives an instruction of print continuation, and generating print data by performing color conversion processing using the color conversion table for the normal state after the temperature of the predetermined portion of the printer becomes lower than the predetermined temperature in case the step (a1) receives an instruction of print standby; and (c) instructing the printer to print the generated print data.

6. A print instruction device for instructing a printer comprising a temperature sensor for detecting the temperature of a predetermined portion to perform a printing operation, the print instruction device comprising:

a temperature acquisition unit for acquiring the temperature detected by the temperature sensor in case a printing requirement is made;

a selection instruction receiving unit for receiving a selection instruction of print continuation or print standby in case the temperature acquired by the temperature acquisition unit is equal to or higher than predetermined temperature;

a print data generation unit for generating print data printable by the printer by performing color conversion processing, in which the color space of image data according to the printing requirement is converted into the color space for printing operation, by using a color conversion table for a normal state in case the temperature acquired by the temperature acquisition unit is lower than the predetermined temperature, generating print data by performing color conversion processing using the color conversion table for a high-temperature state whereby the concentration value in the color space for printing operation becomes smaller in comparison with the color conversion table for the normal state in case the selection instruction receiving unit receives an instruction of print continuation, and generating print data by performing color conversion processing using the color conversion table for the normal state in case the selection instruction receiving unit receives an instruction of print standby; and a print instruction unit for instructing the printer to print the generated print data in case the temperature acquired by the temperature acquisition unit is lower than the predetermined temperature or in case the selection instruction receiving unit receives an instruction of print continuation, and instructing the printer to print the generated print data after the temperature of the predetermined portion of the printer becomes lower than the predetermined temperature in case the selection instruction receiving unit receives an instruction of print standby.

7. A print instruction device according to claim 6, wherein the printer has a cooling unit capable of cooling the predetermined portion, the print instruction device further comprising a cooling instruction unit for instructing the printer, in case the selection instruction receiving unit receives an instruction of print standby to make the cooling capacity of the cooling unit higher compared with the cooling capacity in a normal state.

8. A print instruction device according to claim 7, wherein the cooling unit has a cooling fan, and the cooling instruction unit instructs the printer so that the rotational speed of the cooling fan is higher than the rotational speed in a normal state.

9. A printing apparatus housing in a single chassis; a printer having a temperature sensor for detecting the temperature of a predetermined portion; a temperature acquisition unit for acquiring the temperature detected by the temperature sensor in case a printing requirement is made; a selection instruction receiving unit for receiving a selection instruction of print continuation or print standby in case the temperature acquired by the temperature acquisition unit is equal to or higher than predetermined temperature; a print data generation unit for generating print data printable by the printer by performing color conversion processing, in which the color space of image data according to the printing requirement is converted into the color space for printing operation, by using a color conversion table for a normal state in case the temperature acquired by the temperature acquisition unit is lower than the predetermined temperature, generating print data by performing color conversion processing using the color conversion table for a high-temperature state whereby the concentration value in the color space for printing operation becomes smaller in comparison with the color conversion table for the normal state in case the selection instruction receiving unit receives an instruction of print continuation, and generating print data by performing color conversion processing using the color conversion table for the normal state in case the selection instruction receiving unit receives an instruction of print standby; and a print instruction unit for instructing the printer to print the generated print data in case the temperature acquired by the temperature acquisition unit is lower than the predetermined temperature or in case the selection instruction receiving unit receives an instruction of print continuation, and instructing the printer to print the generated print data after the temperature of the predetermined portion of the printer becomes lower than the predetermined temperature in case the selection instruction receiving unit receives an instruction of print standby.

10. A print instruction method for instructing a printer comprising a temperature sensor for detecting the temperature of a predetermined portion to perform a printing operation, the print instruction method comprising the steps of:

(a) acquiring the temperature detected by the temperature sensor in case a printing requirement is made;

(a1) receiving a selection instruction of print continuation or print standby in case the acquired temperature is equal to or higher than the predetermined temperature, (b) generating print data printable by the printer by performing color conversion processing, in which the color space of image data according to the printing requirement is converted into the color space for printing operation, by using a color conversion table for a normal state in case the acquired temperature at step (a) is lower than the predetermined temperature, generating print data by performing color conversion processing using the color conversion table for a high-temperature state whereby the concentration value in the color space for printing operation becomes smaller in comparison with the color conversion table for the normal state in case the step (a1) receives an instruction of print continuation, and generating print data by performing color conversion processing using the color conversion table for the normal state in case the step (a1) receives an instruction of print standby; and (c) instructing the printer to print the generated print data at step (b) in case the acquired temperature at step (a) is lower than the predetermined temperature or in case the step (a1) receives an instruction of print continuation, and instructing the printer to print the generated print data after the temperature of the predetermined portion of the printer becomes lower than the predetermined temperature in case the step (a1) receives an instruction of print standby.

* * * * *